(12) United States Patent
Anantharaju et al.

(10) Patent No.: US 9,690,931 B1
(45) Date of Patent: Jun. 27, 2017

(54) DATABASE ATTACK DETECTION TOOL

(71) Applicant: Facebook, Inc., Menlo Park, CA (US)

(72) Inventors: Srinath Anantharaju, San Francisco, CA (US); Chad Greene, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 371 days.

(21) Appl. No.: 13/793,309

(22) Filed: Mar. 11, 2013

(51) Int. Cl.
*G06F 15/173* (2006.01)
*G06F 21/55* (2013.01)
*H04L 29/06* (2006.01)

(52) U.S. Cl.
CPC ........ *G06F 21/55* (2013.01); *H04L 29/06911* (2013.01); *H04L 63/1416* (2013.01); *H04L 2463/141* (2013.01)

(58) Field of Classification Search
CPC ............... G06F 21/55; H04L 29/06911; H04L 63/1416; H04L 29/145; H04L 29/1466; H04L 2463/141; H04L 2463/142
USPC .................... 726/226, 204, 223, 224, 23, 25
See application file for complete search history.

(56) References Cited

U.S. PATENT DOCUMENTS

| | | | |
|---|---|---|---|
| 8,782,217 B1* | 7/2014 | Arone et al. | 709/224 |
| 8,966,036 B1* | 2/2015 | Asgekar et al. | 709/223 |
| 2008/0086473 A1* | 4/2008 | Searl | G06F 21/552 |
| 2012/0151046 A1* | 6/2012 | Weiss et al. | 709/224 |
| 2012/0233013 A1* | 9/2012 | Smith | 705/26.5 |
| 2013/0031176 A1* | 1/2013 | Shih et al. | 709/204 |
| 2013/0097683 A1* | 4/2013 | Davis | G06F 21/88 726/7 |
| 2013/0347116 A1* | 12/2013 | Flores et al. | 726/25 |
| 2014/0165195 A1* | 6/2014 | Brdiczka et al. | 726/23 |

* cited by examiner

*Primary Examiner* — Thuong Nguyen
(74) *Attorney, Agent, or Firm* — Perkins Coie LLP

(57) ABSTRACT

The disclosed techniques provide systems and methods for detecting coordinated attacks on social networking databases containing personal end-user data. More specifically, various advanced persistent threat (APT) detection procedures are described that explore the commonality between specific targets of various private data accesses. In one embodiment, a threat detection tool is configured to process various private data accesses initiated by a source user account in order to identify associated query structures. The tool then applies one or more filters to the private data accesses to identify a subset of the private data accesses that have query structures indicating specific targets and processes these specific targets to determine if an access pattern exists. The access pattern can indicate, for example, a measure of commonality among two or more of the specific targets. If an access pattern exists, the threat detection tool can trigger an alarm.

21 Claims, 8 Drawing Sheets

DATABASE ATTACK DETECTION TOOL

FIELD OF THE INVENTION

The present invention generally relates to information privacy. More specifically, various embodiments of the present invention relate to systems and methods for detecting coordinated attacks on social networking databases containing personal end-user data.

BACKGROUND

Companies can store a tremendous amount of end-user data. For example, end-user data can include, but is not limited to, address information, credit card information, photographs, e-mails, healthcare records, financial records, electronic documents, messages, associations with other end-users, and other types of information. Not only do the end-users have an expectation of privacy, but in many cases there can be legal requirements on the dissemination and use of the data. As a result, unauthorized access and/or use of the end-user's data can result in dissatisfied customers and potential legal liability. Accordingly, private end-user data needs to be protected from unauthorized external and internal access (e.g., from employee accounts).

In social networking systems, it is advantageous to keep private end-user data available to employees as the employees may need access to private end-user data in order to perform their duties (e.g., to resolve end-user issues). Traditionally, tools for allowing employees access to private end-user data did not dynamically allocate access to the end-user data. Instead, each employee had access to all of the data or to very large portions of the data. Moreover, traditional tools also did not provide any restrictions on how the data can be used once access has been granted to the tool. One tool that has resolved these challenges and inefficiencies found in traditional tools for granting access to private end-user data is discussed in U.S. application Ser. No. 13/660,980, filed on Oct. 25, 2012, which issued as U.S. Pat. No. 8,887,260, the contents of which are expressly incorporated herein by reference.

U.S. application Ser. No. 13/660,980, which issued as U.S. Pat. No. 8,887,260, discusses various systems and methods for providing token-based access control to various data sets and/or portions thereof. Thus, private end-user data can be accessed via private access tools once the appropriate token(s) are obtained. This allows the social networking systems to keep the private end-user data available to employees for expeditiously resolving end-user issues, among other important employee duties. Unfortunately, in some rare instances, an employee's account can be compromised. For example, an employee's account (e.g., login credentials) can be compromised by clicking on a phishing e-mail attack.

In some cases, the attacks can be coordinated and persistent (e.g., when the attacks are state sponsored). These coordinated and persistent attacks are commonly referred to as advanced persistent threats (APTs). Often, the goal of an APT is to obtain private end-user information associated with particular people, groups, and/or communities. Unfortunately, APTs often avoid detection because they are well funded, organized, and after specific information.

Overall, the examples herein of some prior or related systems and their associated limitations are intended to be illustrative and not exclusive. Upon reading the following, other limitations of existing or prior systems will become apparent to those of skill in the art.

SUMMARY

This summary is provided to introduce certain concepts in a simplified form. The concepts are further described in the Detailed Description below and the drawings. This summary is not intended to identify essential features of the claimed subject matter or to limit the scope of the claimed subject matter.

The techniques introduced herein provide systems and methods for detecting coordinated attacks on social networking databases containing personal end-user data. More specifically, various APT detection procedures are described that explore the commonality between specific targets of various private data accesses. In one embodiment, a threat detection tool is configured to process various private data accesses initiated by a source user account in order to identify associated query structures. The tool then applies one or more filters to the private data accesses to identify a subset of the private data accesses that have query structures indicating specific targets and processes these specific targets to determine if an access pattern exists. The access pattern can indicate, for example, a measure of commonality among two or more of the specific targets. If an access pattern exists, the threat detection tool can trigger an alarm.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

One or more embodiments of the present invention are illustrated by way of example and not limitation in the figures of the accompanying drawings, in which like references indicate similar elements.

Figure 1:
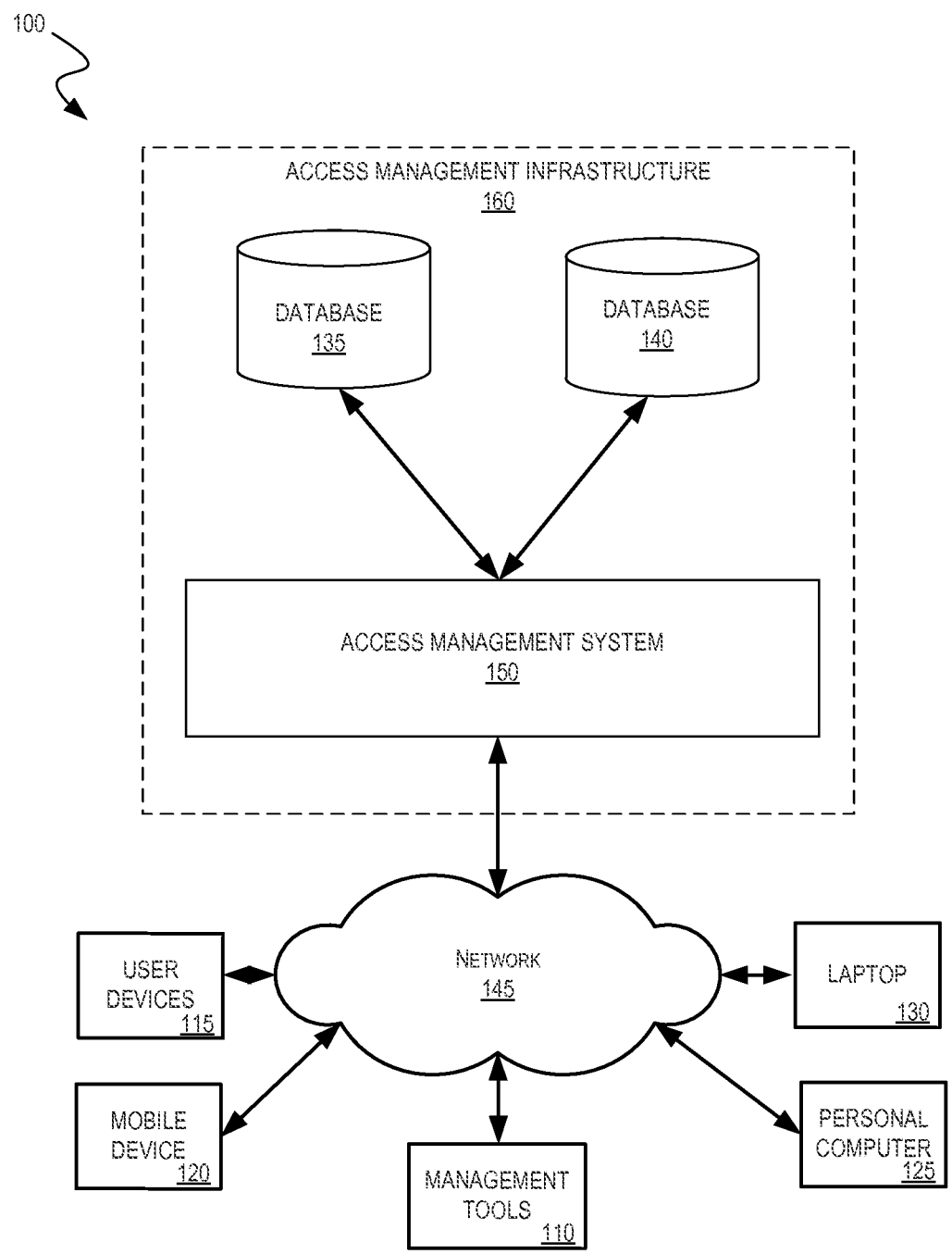
FIG. 1 depicts a block diagram illustrating an example of a networked-based environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to information privacy. More specifically, various embodiments of the present invention relate to systems and methods for detecting coordinated attacks on social networking databases containing personal end-user data. There are various tools for granting access to private end-user data. For example, private end-user data can now be accessed via private access tools once the appropriate token(s) are obtained. These tools allow the social networking systems to keep the private end-user data available to employees for expeditiously resolving end-user issues, among other important employee duties. Unfortunately, in some rare instances, an employee's account (e.g., login credentials) can be compromised resulting in the possibility of an attack.

The threat detection procedures and/or threat detection tools described herein identify potential APTs by exploring the commonality among specific targets of the private data accesses. The commonality can indicate various access patterns that trigger one or more alerts. Accordingly, the described procedures and tools overcome the issues of the prior art.

In one embodiment, an APT tool is configured to process a plurality of private data accesses initiated by a source user account to identify associated query structures. One or more filters are then applied to the plurality of private data accesses to identify a subset of the plurality of private data accesses that have query structures indicating specific targets. The specific targets are then processed to determine if one or more access patterns exists. An access pattern can indicate a measure of commonality among two or more of the specific targets. If an access pattern exists, the threat detection tool triggers an alarm. In one embodiment, the alarm can indicate an APT or a potential APT.

The specific targets can be user accounts associated with individuals, groups, organizations, and/or communities. The measure of commonality among the specific targets can be based on any number of factors including, but not limited to, common location (e.g., country, city, or state of residence or origin), common organization (e.g., FBI, etc.), common groups (e.g., activist groups), common events (e.g., Facebook events or causes), and/or a common purpose. In one embodiment, the common purpose can be determined or derived based on social relationship information associated with the targets.

In one embodiment, processing the specific targets to determine if an data access pattern exists includes identifying the factors associated with the specific targets, comparing the factors to each other to identify factors that are common among the specific targets, and determining the measure of commonality among two or more of the specific targets based on the identified factors that are common to the specific targets. The commonality among the specific targets and/or the factors may be determined using one or more adaptive rule sets. Additionally, a weight or relative importance can be applied to one or more of the factors. In this case, the measure of commonality among two or more of the specific targets can be based on the applied weights and/or a quantity of common factors.

In one embodiment, crowd sourcing may be utilized to help verify that end-user (e.g., employee) accounts that have accessed private end-user data (or performed other suspicious activity) have been compromised. For example, one or more of the private data accesses associated with the common specific targets (as determined by the common factors), can be marked or otherwise flagged if an access pattern exists. These marked or flagged private data accesses can be used as part of an automatic query to the end-user (e.g., employee). The query can determine whether or not the end-user actually performed the private data accesses. Crowd (or employee) sourcing in this manner is a quick and efficient way to confirm or deny a threat (e.g., APT).

The techniques introduced herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Although the techniques described herein are discussed with respect to a social networking system, the techniques are equally applicable to any storage and/or access system. Accordingly, the embodiments described herein are not limited to social networking systems.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" or "engine" refers broadly to software, hardware, or firmware (or any combination thereof) components. Modules or engines are typically functional components that can generate useful data or other output using specified input(s). A module may or may not be self-contained. An application program (also called an "application") may include one or more modules, or a module can include one or more application programs.

The terms "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Environment

FIG. 1 depicts a block diagram illustrating an example of a networked-based environment 100 in which some embodiments of the present invention may be utilized. Companies can generate and store a tremendous amount of data (e.g., photographs, messages, e-mails, electronic documents, or healthcare records) and related analytics (e.g., usage analytics). Much of this information is private end-user data. Private end-user data is data that is not available to and/or otherwise accessible by the general public. The data can be submitted through various management tools 110, user devices 115, mobile devices 120, personal computers 125, laptops 130, and/or other devices to allow the data to be stored on one or more databases 135 and 140. As illustrated in FIG. 1, these devices and tools may use network 145 to submit and retrieve information from the databases 135 and 140. Various embodiments of the present invention use access management system 150 within access management infrastructure 160 to detect malicious or otherwise abusive access of private end-user data that is stored on databases 135 and/or 140.

User device 115 can be any computing device capable of receiving user input as well as transmitting and/or receiving data via the network 145. In one embodiment, user device 115 is a conventional computer system, such as a desktop 125 or laptop computer 130. In another embodiment, user device 115 may be mobile device 120 having computer functionality, such as a personal digital assistant (PDA), mobile telephone, smart-phone, or similar device. User device 115 is configured to communicate with access management system 150 and/or the financial account provider via the network 145. In one embodiment, user device 115 executes an application allowing a user of user device 115 to interact with the access management system 150. For example, user device 115 can execute a browser application to enable interaction between the user device 115 and access management system 150 via the network 145. In another embodiment, user device 115 interacts with access management system 150 through an application programming interface (API) that runs on the native operating system of the user device 208, such as iOS® or ANDROID™.

User devices 115 can be configured to communicate via the network 145, which may comprise any combination of local area and/or wide area networks, using both wired and wireless communication systems. In one embodiment, network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over network 145 may be represented using technologies and/or formats including hypertext markup language (HTML) or extensible markup language (XML). In addition, all or some of the links can be encrypted using conventional encryption technologies such as secure sockets layer (SSL), transport layer security (TLS), and Internet Protocol security (IPsec).

Figure 2:
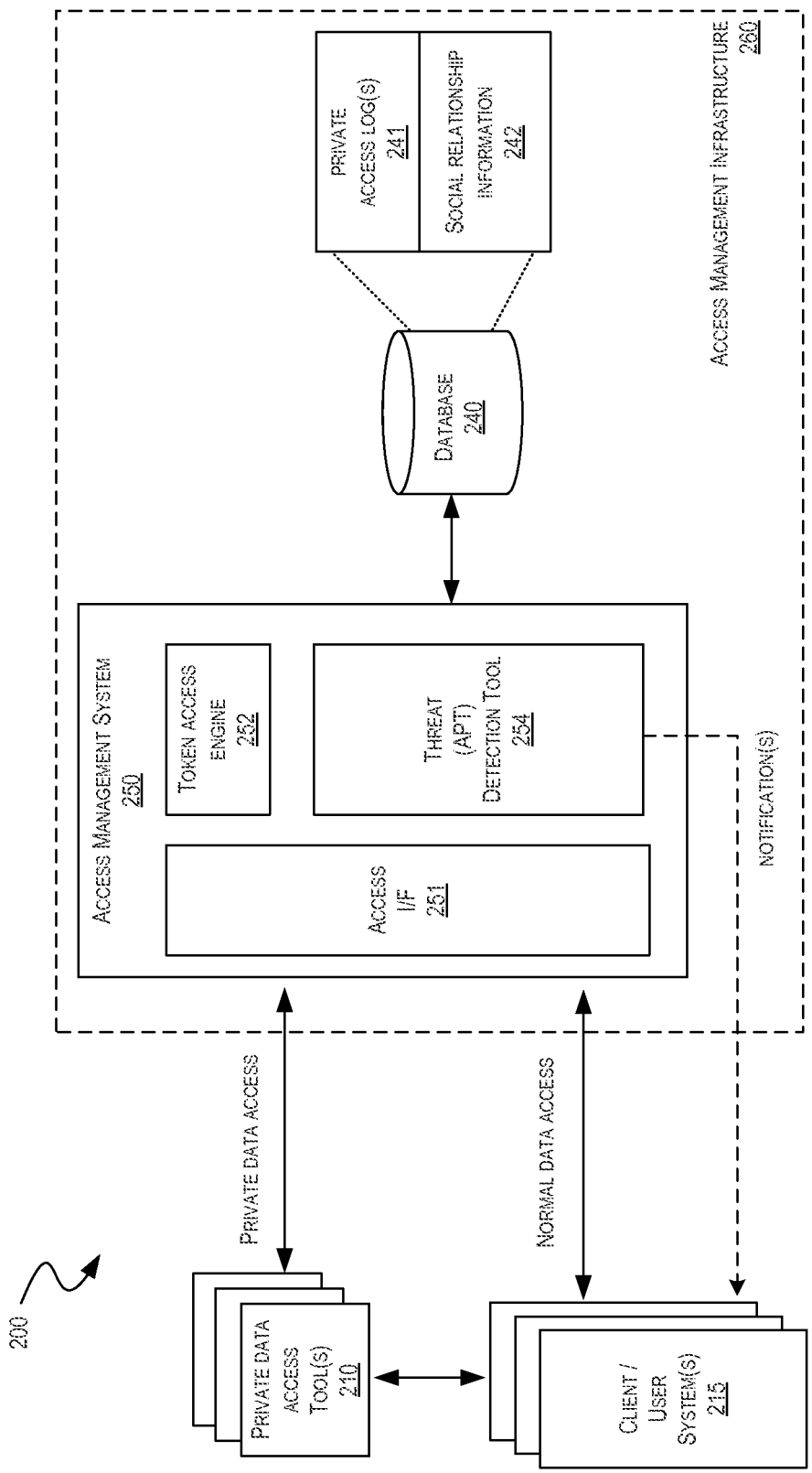
FIG. 2 depicts a block diagram illustrating an example of an access management infrastructure.

FIG. 2 depicts a block diagram illustrating a more detailed example of an access management infrastructure 260 in a networked-based example environment 200, according to an embodiment. The access management infrastructure 260 and the networked-based example environment 200 can be the access management infrastructure 160 and the networked-based example environment 100 of FIG. 1, respectively, although other configurations are possible. As shown, the networked-based example environment 200 includes various private data access tools 210, various client or user system(s) 215, and an access management infrastructure 265. Other systems, databases, and/or components are also possible.

The private data access tools 210 and the client or user system(s) 215 can be configured to communicate via one or more networks such as, for example, network 145 of FIG. 1, with the access management system 250 in order to access end-user account information (e.g., social relationship information 242). When an end-user accesses his/her own account, this end-user data access is considered to be a normal data access. In one embodiment, a normal end-user data access can include creating, generating, reading, downloading, uploading, and/or otherwise accessing or providing social relationship information. The access management system 250 stores some or all of this social relationship information within database 240 (e.g., social relationship information 242).

The private data access tools 210 can, together with the access management infrastructure 260, facilitate private access to end-user data stored within the access management infrastructure 260. This end-user data access is considered private data access because someone other than the end-user of an account is accessing private (i.e., non-public) end-user information from the end-user's account. More specifically, a private data access is an access of an end-users private data via a private data access tool 210 by an authorized user (e.g., an employee) other than the end-user. As discussed above, the employee(s) may need access to the private end-user data in order to perform their duties (e.g., to resolve end-user issues). Unfortunately, in some rare instances, employees can abuse the private data access tools 210 and/or the employees accounts can be compromised resulting in abuse of the private data access tools 210.

Examples of private data access tools 210 can include, but are not limited to, tools that allow an employee to access the end-user account as if the employee is the end-user or tools that allow an employee to essentially ignore end-user privacy settings in order to access the end-user account. In one embodiment, a private end-user data access can create, generate, read, download, upload, and/or otherwise access or provide social relationship information related to the end-user. The social relationship information can be added, read, and/or deleted from the end-user's account. As shown, the private data access tools 210 are discrete tools; however, in one or more embodiments, the private data access tools 210 can be included within the access management infrastructure 260 and/or the access management system 250.

The access management infrastructure 260 can include various access management systems 250 and databases 240. As shown, the access management infrastructure 260 includes an access management system 250 and a database 240. The access management system 250 includes an access interface (I/F) 251, a token access engine 252, and a threat (APT) detection tool 254. Other systems, databases, and/or components are also possible.

The access interface 251 can be configured to facilitate communications between the access management infrastructure 260, the various client or user system(s) 215, and/or the private data access tools 210 via a network such as, for example, network 145 of FIG. 1. The communications can, among other things, comprise normal or private data accesses.

The token access engine 252 generates unique tokens for the private data access tools so that the tools can access the private end-user data. In one embodiment, the private end-user data can be accessed via private access tools once the appropriate token(s) are obtained from the token access engine 252 of the access management system. As part of a private data access, the access management system 250 maintains various private access logs 241 in database 240. The private access logs 241 ensure that a trail or record of private data access is maintained.

The threat (APT) detection tool 254 can monitor, scan, and/or otherwise process the private data access logs 241 and/or the social relationship information 242 in order to detect coordinated attacks on social networking databases containing personal end-user data in social networking systems. Although shown as a component of the access management system 250, the threat (APT) detection tool 254 can comprise one or more discrete systems that are physically and/or functionally distributed.

In one embodiment, the threat (APT) detection tool 254 identifies a source user account with private data access capabilities. That is, the threat (APT) detection tool 254 can identify employee accounts that have access to particular tools that facilitate private data access. The threat (APT) detection tool 254 can scan the private access log(s) 241 associated with the source user account for private data accesses initiated by the source user. The threat (APT) detection tool 254 processes the private data accesses to identify query structures associated with each private data access. Each private data access is essentially a request for information. The information can be specific or general. For example, a request for all end-user accounts that are younger than thirty years old is a general request. Conversely, a request for a single end-user's (or any entity's) account information is a specific request (i.e., a request for a specific target). In one embodiment, the specific targets can be user accounts associated with individuals, groups, organizations, and/or communities.

The threat (APT) detection tool 254 applies one or more filters to the private data accesses to identify a subset of the plurality of private data accesses. More specifically, the threat (APT) detection tool 254 identifies those private data accesses that have query structures indicating specific targets. The specific targets are then processed to determine if an access pattern exists. If the access pattern exists, the threat (APT) detection tool 254 triggers an alarm. The alarm may indicate a potential advanced persistent threat. By way of example, an alarm may be triggered if the threat detection tool identifies a pattern of accessing specific Chinese activist data.

In one embodiment, the access pattern can indicate a measure of commonality among the specific targets. The measure of commonality among the specific targets can be based on any number of factors including, but not limited to, common location (e.g., country, city, or state of residence or origin), common organization (e.g., FBI, etc.), common groups (e.g., activist groups), common events (e.g., Facebook events or causes), and/or a common purpose. In one embodiment, the common purpose can be determined or derived based on social relationship information associated with the targets.

In one embodiment, processing the specific targets to determine if an data access pattern exists includes identifying the factors associated with the specific targets, comparing the factors to each other to identify factors that are common among the specific targets, and determining the measure of commonality among two or more of the specific targets based on the identified factors that are common to the specific targets. Additionally, a weight or relative importance can be applied to one or more of the factors. In this case, the measure of commonality among two or more of the specific targets can be based on the applied weights and/or a quantity of common factors.

The various modules, components, and/or functions that can be associated with and/or included within a threat (APT) detection tool 254 are discussed in greater detail with reference to FIG. 3.

Figure 3:
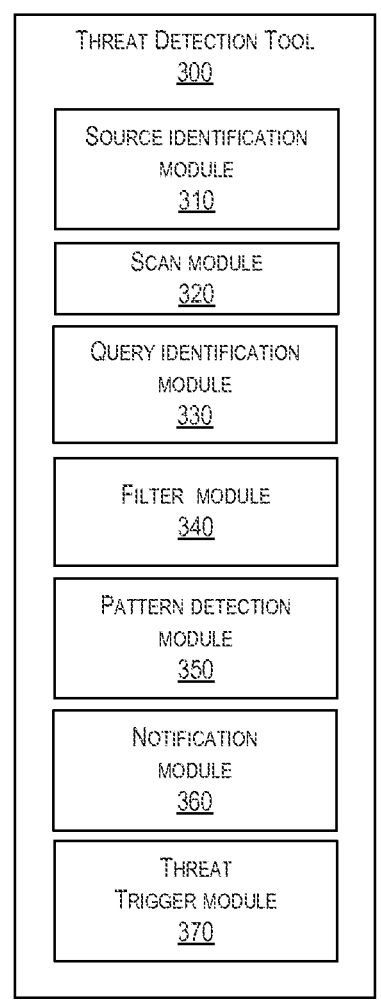
FIG. 3 depicts a block diagram illustrating an example threat detection tool for detecting coordinated attacks on social networking databases containing personal end-user data.

FIG. 3 depicts a block diagram illustrating an example threat detection tool 300 for detecting coordinated attacks (or APTs) on social networking databases containing personal end-user data, according to an embodiment. The threat detection tool 300 can be the threat detection tool 254 of FIG. 2, although alternative configurations are possible. In the example of FIG. 3, the threat detection tool 300 includes a source identification module 310, a scan module 320, a query identification module 330, a filter module 340, a pattern detection module 350, a notification module 360, and a threat trigger 370. Additional or fewer modules are also possible.

The threat detection tool 300, although illustrated as comprised of distributed components (physically distributed and/or functionally distributed), could be implemented as a collective element. In some embodiments, some or all of the modules, and/or the functions represented by each of the modules, can be combined in any convenient or known manner. Furthermore, the functions represented by the modules and/or engines can be implemented individually or in any combination thereof, partially or wholly, in hardware, software, or a combination of hardware and software.

The source identification module 310 is configured to identify a source account with private data access capabilities. For example, the source identification module 310 can identify employee accounts that have access to particular tools that facilitate private data access. Examples of private data access tools include, but are not limited to, tools that allow an employee to access the end-user account as if the employee is the end-user, tools that allow an employee to essentially ignore end-user privacy settings in order to access the end-user account, etc.

The scan module 320 is configured to scan private access log(s) associated with the identified source user account for private data accesses initiated by the source user. For example, the scan module 320 may access one or more databases 240 to read or query for private access logs 241. Alternatively or additionally, various pipelines or queues may deliver the private access log(s) periodically or based on one or more triggers. For example, the pipelines could run daily, weekly, monthly, etc. Additionally, the private access logs could include private data accesses that are initiated by the source user account over a specific duration of time. In one embodiment, the specified duration of time can be expanded. For example, the specified duration of time could be expanded if the measure of commonality among the specific targets exceeds a threshold.

The query identification module 330 is configured to process the private data accesses initiated by a source user account to identify associated query structures. As discussed above, each private data access is essentially a request for information. The information can be specific or general. For example, a request for all end-user accounts that are younger than thirty years old is general request. Conversely, a request for a single end-user's (or any entity's) account information is a specific request (i.e., a request for a specific target). In one embodiment, the specific targets can be user accounts associated with individuals, groups, organizations, and/or communities.

In one example, Structured Query Language (SQL) is used as the database language. In this case, the query identification module 330 processes the private access to identify what information the query is after. For example, a query can select a number of columns representing characteristics of users they are looking for (e.g., age, user identifier (ID), etc.). The query identification module 330 identifies this structure.

The filter module 340 is configured to filter private data accesses to identify a subset of the private data accesses with query structures that indicate specific targets. In this manner, the filter module 340 effectively reduces the number of private data accesses that the threat detection tool has to process. In a busy social networking system, each employee may initiate eighty thousand or more queries (or private data accesses) a day. To reduce the number of queries that need to be processed, these queries are filtered to include a subset that indicate specific targets. A specific target may exist if, for example, the query structure indicates that the user identifier is set to a specific value or values.

The pattern detection module 350 is configured to process the specific targets to determine if one or more access pattern exists. As discussed above, the access patterns can indicate a measure of commonality among two or more of the specific targets. The measure of commonality can be based on any number of factors associated with the specific targets.

In one embodiment, the access pattern can indicate a measure of commonality among the specific targets. The measure of commonality among the specific targets can be based on any number of factors including, but not limited to, common location (e.g., country, city, or state of residence or origin), common organization (e.g., FBI, etc.), common groups (e.g., activist groups), common events (e.g., Facebook events or causes), and/or a common purpose. In one embodiment, the common purpose can be determined or derived based on social relationship information associated with the targets.

In one embodiment, processing the specific targets to determine if a data access pattern exists includes identifying the factors associated with the specific targets, comparing the factors to each other to identify factors that are common among the specific targets, and determining the measure of commonality among two or more of the specific targets based on the identified factors that are common to the specific targets. Additionally, a weight or relative importance can be applied to one or more of the factors. In this case, the measure of commonality among two or more of the specific targets can be based on the applied weights and/or a quantity of common factors. An example of processing the specific targets to determine if an access pattern exists is discussed in greater detail with respect to FIG. 5.

The notification module 360 is configured to generate and send one or more notifications to a source account and/or other related accounts. The notifications may be in the form of a query requesting the source user confirm or deny the legitimacy of a threat. For example, in some embodiments, the end-user (e.g., employee) may be asked to confirm whether or not they intended to initiate one or more specific private data accesses that have been flagged or marked as potential threats. In one embodiment, the notification module 360 essentially controls some or all of the crowd sourcing functionality described with respect to FIG. 6.

The threat trigger module 370 is configured to generate and trigger one or more alarms or pre-alarms if the access pattern exists. For example, as discussed above, the access pattern can indicate a measure of commonality among two or more of the specific targets. If the measure of commonality is determined to be above an alarm threshold, an alarm may be triggered. The alarm can indicate to one or more members of a security team that a threat has been detected and appropriate action should be taken.

In one embodiment, the threat trigger module 370 can also determine severity of the threat. For example, if the tool detects that the measure of commonality exceeds a pre-alarm threshold but not an alarm threshold, the system may enlist the end-user in determining and/or otherwise deciding if there is a potential threat. That is, if the measure of commonality is determined to be above a pre-alarm threshold, a pre-alarm may be triggered. The notification module 360 sends the pre-alarm notification, receives a response, and sends the response to the threat trigger module 370 for processing.

Methods for Threat Detection

Figure 4:
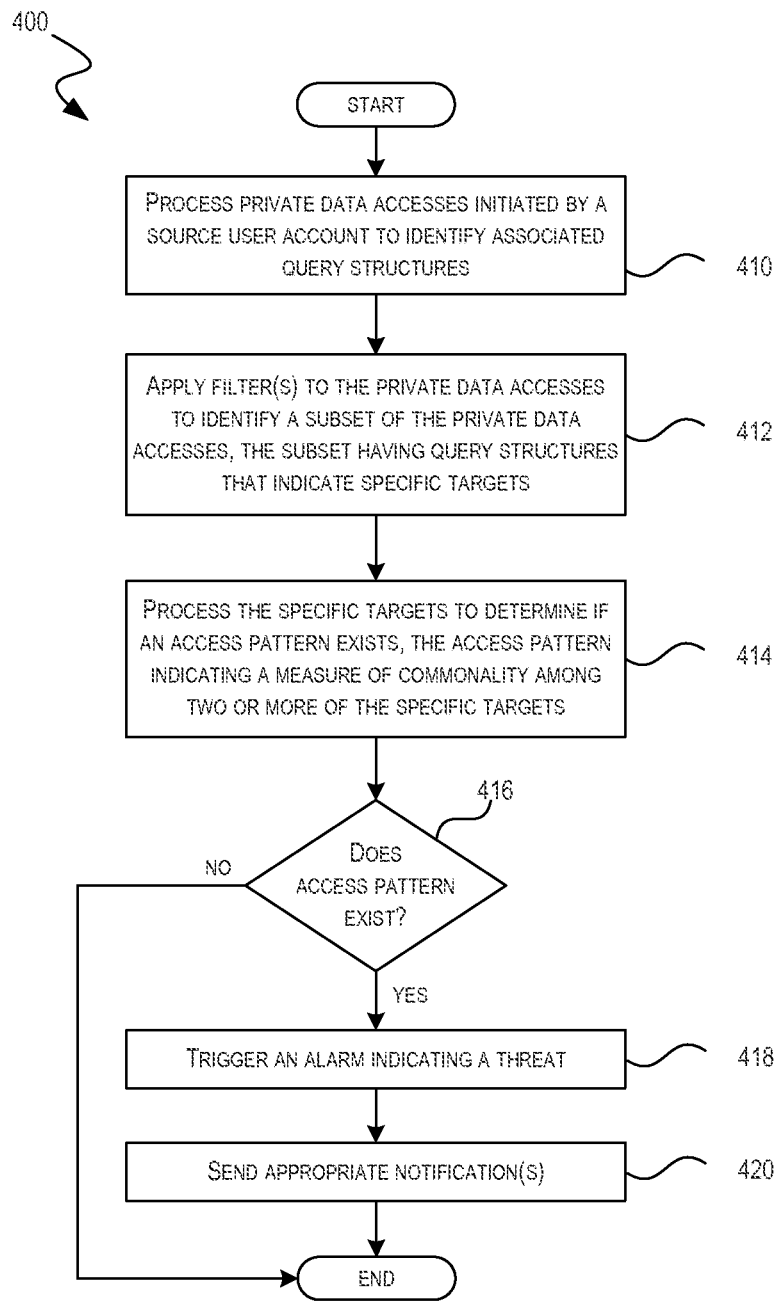
FIG. 4 depicts a flowchart illustrating an example process for detecting a coordinated attack on a social networking database containing personal end-user data.

FIG. 4 depicts a flowchart illustrating an example process 400 for detecting a coordinated attack on a social networking database containing personal end-user data, according to an embodiment. The operations illustrated in FIG. 4 may be performed in various embodiments by a threat detection tool 254 of FIG. 2, a processor, and/or other modules, engines, components, or tools associated with access management system 150 of FIG. 1. Additional or fewer steps are possible.

To begin, at step 410, the threat detection tool processes private data accesses initiated by a source user account to identify associated query structures. Each private data access can be a request for information. The information can be specific or general. For example, a request for all end-user accounts that are younger than thirty years old is a general request. Conversely, a request for a single end-user's (or any entity's) account information is a specific request (i.e., a request for a specific target). In one embodiment, the specific targets can be user accounts associated with individuals, groups, organizations, and/or communities. The private data accesses that are processed can be accesses that occurred over a duration of time. For example, the private data accesses could have occurred over the duration of a day, a week, or even a month or more. Furthermore, in some embodiments, the threat detection tool can expand the duration of time based on specific triggers, etc.

At step 412, the threat detection tool applies one or more filters to the private data accesses to identify a subset of the private data accesses having query structures that indicate specific targets. The filters reduce the number of private data accesses that the threat detection tool has to process. For example, in a busy social networking system, each employee may initiate eighty thousand or more queries (or private data accesses) a day. To reduce the number of queries that need to be processed, these queries are filtered to include a subset that indicates specific targets. A specific target may exist if, for example, the query structure indicates that the user identifier is set to a specific value or values.

At step 414, the threat detection tool processes the specific targets to determine if an access pattern exists that indicates a measure of commonality among two or more of the specific targets. As discussed above, the access patterns can indicate a measure of commonality among two or more of the specific targets. The measure of commonality can be based on any number of factors associated with the specific targets. An example of processing specific targets to determine if an access pattern exists and the possible factors is discussed in greater detail with reference to FIG. 5.

At a decision step 416, the threat detection tool determines if an access pattern exists. If the access pattern does not exist, then the process is terminated. Otherwise, at step 418, the threat detection tool triggers an alarm. The alarm can indicate an APT. Lastly, at step 420, the threat detection tool sends appropriate notifications of the APT. For example, notifications may be sent to one or more members of a security team and/or the source user account.

Figure 5:
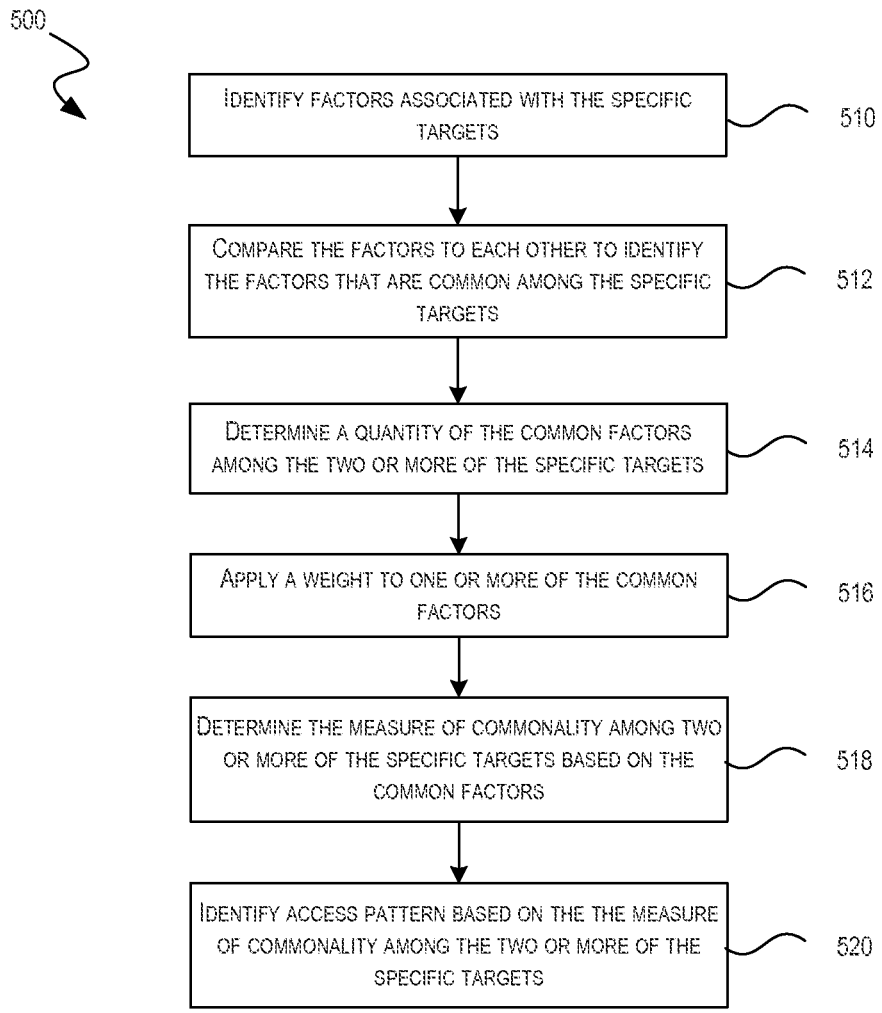
FIG. 5 depicts a flowchart illustrating an example process for processing specific targets of a coordinated attack on a social networking database containing personal end-user data to determine if an access pattern exists.

FIG. 5 depicts a flowchart illustrating an example process 500 for processing specific targets of a coordinated attack on a social networking database containing personal end-user data to determine if an access pattern exists, according to an embodiment. The operations illustrated in FIG. 5 may be performed in various embodiments by a threat detection tool 254 of FIG. 2, a processor, and/or other modules, engines, components or tools associated with access management system 150 of FIG. 1. Additional or fewer steps are possible.

To begin, as discussed with respect to FIG. 4, the threat detection tool filters the private data accesses to identify a subset of the private data accesses having query structures that indicate a specific target. At step 510, the threat detection tool identifies various factors associated with the specific targets. For example, each target may have various associated factors. As discussed above, the various factors can include, but are not limited to, current location or residence (e.g., country, city, or state of residence or origin); organizations (e.g., FBI, etc.); groups, memberships, or affiliations (e.g., activist groups); events (e.g., online events or causes); and/or a general purposes. In one embodiment, the general purpose associated with a target user account can be determined or derived based on social relationship information associated with the target.

At step 512, the threat detection tool compares the identified factors to each other to determine whether any of the factors associated with different targets are common. If several of the factors associated with the different targets are common, then the targets may be related, indicating a possible pattern of access. At step 514, the threat detection tool determines a quantity of common factors among two or more of the specific targets. At step 516, a weight can optionally be applied to one or more of the common factors. For example, a common activist group organization may be weighted higher than other groups or other factors.

At step 518, the measure of commonality among the two or more specific targets is determined based on the common factors. This measure can be based on one or more adaptive rule sets that take into account, for example, a quantity of common factors and/or the weighted values of the common factors. Lastly, at step 520, the threat detection tool identifies or determines the access pattern based on the measure of commonality.

Crowdsourcing Threats

Figure 6:
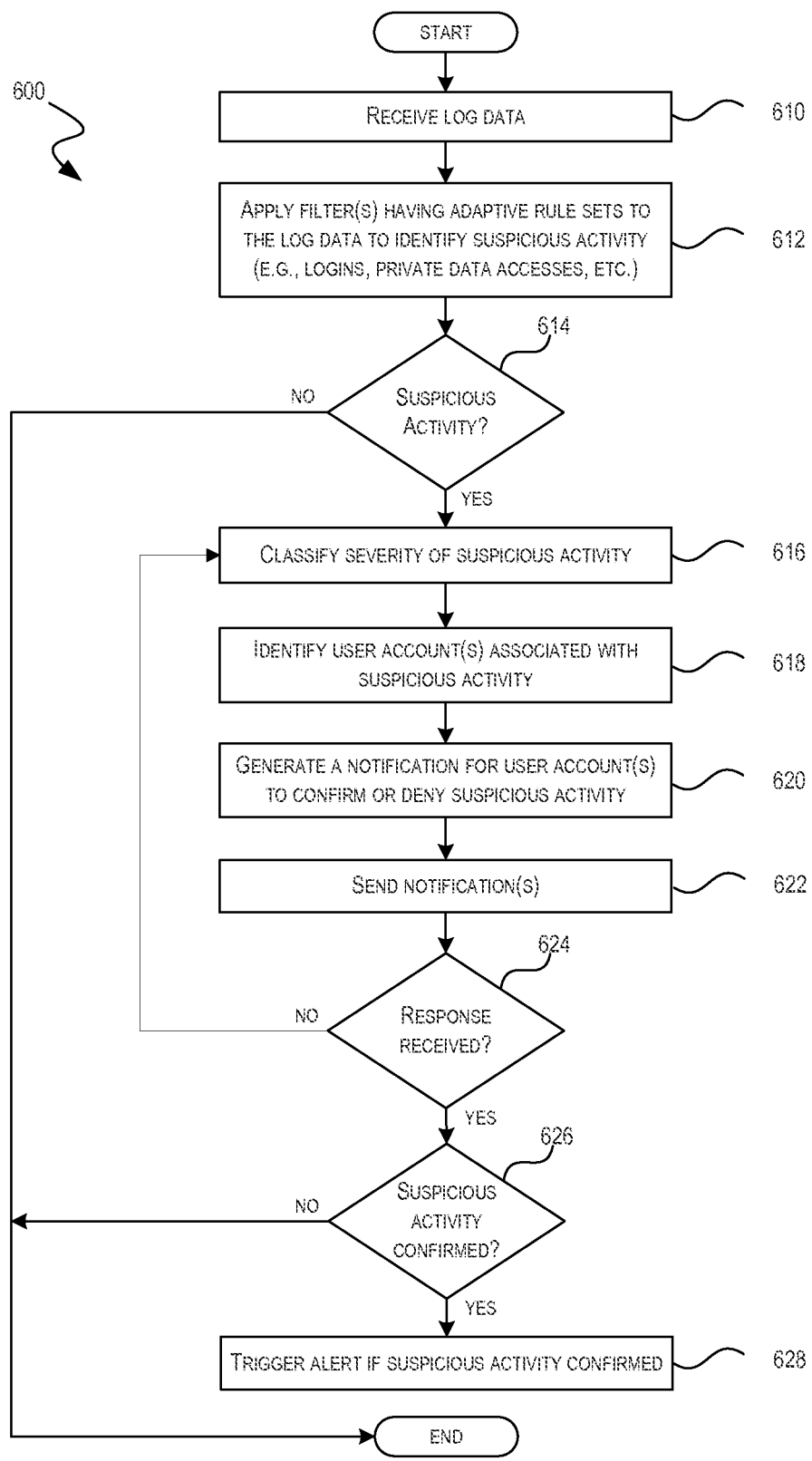
FIG. 6 depicts a flowchart illustrating an example process for detecting suspicious activity in a social networking site and crowd sourcing the suspicious activity.

FIG. 6 depicts a flowchart illustrating an example process 600 for detecting suspicious activity in a social networking site and crowd sourcing the suspicious activity to determine legitimacy of the suspicious activity, according to an embodiment. The operations illustrated in FIG. 6 may be performed in various embodiments by a threat detection tool 254 of FIG. 2, a processor, and/or other modules, engines, components, or tools associated with access management system 150 of FIG. 1. Additional or fewer steps are possible.

To begin, at step 610, the threat detection tool receives log data. For example, the threat detection tool may receive or otherwise access private access logs 241 of FIG. 2. At step 612, the threat detection tool applies one or more filters having adaptive rule sets to the log data to identify suspicious activity. The suspicious activity can include, by way of example, suspicious logins, suspicious private data accesses, etc.

At step 614, if no suspicious activity is detected, then the process ends. Otherwise, at step 616, the threat detection tool classifies the severity of the suspicious activity. The classification of the severity of the suspicious activity can be based on, for example, the type of suspicious activity, the behavior associated with the suspicious activity, etc.

At step 618, the threat detection tool identifies the end-user accounts associated with the suspicious activity. These are the accounts that will be used to crowd source (or employee source) the suspicious activity. For example, the suspicious activity may be associated with a particular end-user or employee's account. Additionally, one or more other employee accounts can be associated with the end-user's account. The other end-user accounts could be other employees that have agreed to cross-monitor accounts, the employee's manager, and/or any other pre-assigned end-user account.

At step 620, the threat detection tool generates a notification for the identified end-user accounts and, at step 622, sends the notification to the end-user accounts. At a decision step 624, the threat detection tool determines if a response from one or more of the end-user accounts has been received. If a response has not been received after a pre-specified time period, the suspicious activity can be escalated and/or reclassified in step 616. Otherwise, if a response is received, at a decision step 626, the threat detection tool determines if the suspicious activity is confirmed by one or more of the end-users.

If the suspicious activity is not confirmed (e.g., the suspicious activity is deemed benign, known, or okay), then the process ends. Otherwise, at step 628, the threat detection tool triggers an alert indicating that the suspicious activity is confirmed. Responsive to the trigger, the security team can attempt to deal with the suspicious activity by changing access, passwords, etc., and/or otherwise suspending or blocking access.

Social Networking System Overview

As mentioned above, embodiments of the present invention can be utilized within a social networking system.

Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, and/or manufacturers. The social networking system allows its users to interact with each other as well as with other objects maintained by the social networking system. In some embodiments, the social networking system allows users to interact with third-party websites and financial account providers.

Based on stored data about users, objects, and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 7:
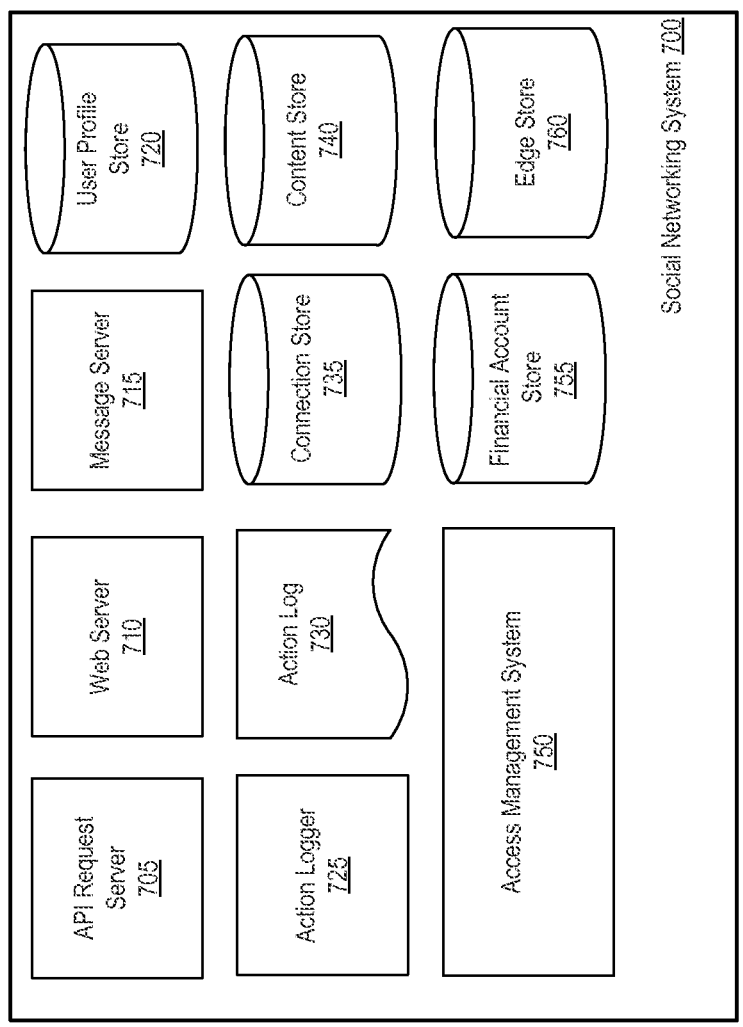
FIG. 7 is a block diagram of a system architecture of the social networking system with which some embodiments of the present invention may be utilized.

FIG. 7 is a block diagram of a system architecture of the social networking system 700 with which some embodiments of the present invention may be utilized. Social networking system 700, illustrated by FIG. 7, includes API request server 705, web server 710, message server 715, user profile store 720, action logger 725, action log 730, connection store 735, content store 740, access management system 750, financial account store 755, and edge store 760. Although not shown, some or all of the servers, stores, etc., may comprise the storage management system discussed herein. In other embodiments, social networking system 700 may include additional, fewer, or different modules for various applications. Conventional components such as network interfaces, security mechanisms, load balancers, failover servers, management and network operations consoles, and the like are not shown so as to not obscure the details of the system architecture. Access management system 750 may be access management system 150 of FIG. 1, although alternative configurations are possible.

API request server 705 allows other systems, user devices, or tools to access information from social networking system 700 by calling APIs. The information provided by the social network may include user profile information or the connection information of users as determined by their individual privacy settings. For example, a system, user device, or tool attempting to access data connections within a social networking system may send an API request to social networking system 700 via a network. The API request is received at social networking system 700 by API request server 605. API request server 605 processes the request by submitting the access request to access management system 650, where access is determined and any data communicated back to the requesting system, user device, or tools via a network.

Web server 710 links social networking system 700 via a network to one or more client devices; the web server serves web pages, as well as other web-related content, such as Java, Flash, XML, and so forth. The web server 710 may communicate with the message server 715 that provides the functionality of receiving and routing messages between social networking system 700 and client devices. The messages processed by message server 715 can be instant messages, queued messages (e.g., email), text and SMS (short message service) messages, or any other suitable messaging technique. In some embodiments, a message sent by a user to another can be viewed by other users of social networking system 700, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 700 is associated with a user profile, which is stored in user profile store 720. A user profile includes declarative information about the user that was explicitly shared by the user, and may also include profile information inferred by social networking system 700. In one embodiment, a user profile includes multiple data fields, each data field describing one or more attributes of the corresponding user of social networking system 700. The user profile information stored in user profile store 720 describes the users of social networking system 600, including biographic, demographic, and other types of descriptive information, such as work experience, educational history, gender, hobbies or preferences, location, and the like. A user profile may also store other information provided by the user such as images or videos. In certain embodiments, images of users may be tagged with identification information of users of social networking system 700 displayed in an image. A user profile in user profile store 720 may also maintain references to actions by the corresponding user performed on content items in content store 740 and stored in the edge store 760.

A user profile may be associated with one or more financial accounts, allowing the user profile to include data retrieved or derived from a financial account. A user may specify one or more privacy settings, which are stored in the user profile, that limit information from a financial account that social networking system 700 is permitted to access. For example, a privacy setting limits social networking system 700 to accessing the transaction history of the financial account and not the current account balance. As another example, a privacy setting limits social networking system 700 to a subset of the transaction history of the financial account, allowing social networking system 700 to access transactions within a specified time range, transactions involving less than a threshold transaction amount, transactions associated with specified vendor identifiers, transactions associated with vendor identifiers other than specified vendor identifiers, or any suitable criteria limiting information from a financial account identified by a user that is accessible by a social networking system 700. In one embodiment, information from the financial account is stored in user profile store 720. In other embodiments, it may be stored in financial account store 755.

Action logger 725 receives communications about user actions on and/or off social networking system 700, populating action log 730 with information about user actions. Such actions may include, for example, adding a connection to another user, sending a message to another user, uploading an image, reading a message from another user, viewing content associated with another user, and attending an event posted by another user, among others. In some embodiments, action logger 725 receives, subject to one or more privacy settings, transaction information from a financial account associated with a user and identifies user actions from the transaction information. For example, action logger 725 retrieves vendor identifiers from the financial account's transaction history and identifies an object, such as a page, in social networking system 700 associated with the vendor identifier. This allows action logger 725 to identify a user's purchases of products or services that are associated with a page, or another object, in content store 740. In addition, a number of actions described in connection with other objects are directed at particular users, so these actions are associated with those users as well. These actions are stored in action log 730.

Action log 730 may be used by social networking system 700 to track user actions on social networking system 700, as well as external websites that communicate information to social networking system 700. Users may interact with various objects on social networking system 700, including commenting on posts, sharing links, checking-in to physical locations via a mobile device, accessing content items in a sequence, or other interactions. Information describing these actions is stored in action log 730. Additional examples of interactions with objects on social networking system 700 included in action log 730 include commenting on a photo album, communications between users, becoming a fan of a musician, adding an event to a calendar, joining groups, becoming a fan of a brand page, creating an event, authorizing an application, using an application, and engaging in a transaction. Additionally, action log 730 records a user's interactions with advertisements on social networking system 700 as well as other applications operating on social networking system 700. In some embodiments, data from action log 730 is used to infer interests or preferences of the user, augmenting the interests included in the user profile and allowing a more complete understanding of user preferences.

Action log 730 may also store user actions taken on external websites and/or determined from a financial account associated with the user. For example, an e-commerce website that primarily sells sporting equipment at bargain prices may recognize a user of social networking system 700 through social plug-ins that enable the e-commerce website to identify the user of social networking system 700. Because users of social networking system 700 are uniquely identifiable, e-commerce websites, such as this sporting equipment retailer, may use the information about these users as they visit their websites. Action log 730 records data about these users, including webpage viewing histories, advertisements that were engaged, purchases made, and other patterns from shopping and buying. Actions identified by action logger 725 from the transaction history of a financial account associated with the user allow action log 730 to record further information about additional types of user actions.

Content store 740 stores content items associated with a user profile, such as images, videos, or audio files. Content items from content store 740 may be displayed when a user profile is viewed or when other content associated with the user profile is viewed. For example, displayed content items may show images or videos associated with a user profile or text describing a user's status. Additionally, other content items may facilitate user engagement by encouraging a user to expand his connections to other users, to invite new users to the system, or to increase interaction with the social network system by displaying content related to users, objects, activities, or functionalities of social networking system 700. Examples of social networking content items include suggested connections or suggestions to perform other actions; media provided to, or maintained by, social networking system 700 (e.g., pictures or videos); status messages or links posted by users to the social networking system, events, groups, pages (e.g., representing an organization or commercial entity); and any other content provided by, or accessible via, the social networking system.

Content store 740 also includes one or more pages associated with entities having user profiles in user profile store 720. An entity is a non-individual user of social networking system 700, such as a business, a vendor, an organization, or a university. A page includes content associated with an entity and instructions for presenting the content to a social networking system user. For example, a page identifies content associated with the entity's user profile as well as information describing how to present the content to users viewing the brand page. Vendors may be associated with pages in content store 740, allowing social networking system users to more easily interact with the vendor via social networking system 700. A vendor identifier is associated with a vendor's page, allowing social networking system 700 to identify the vendor and/or retrieve additional information about the vendor from user profile store 720, action log 730, or from any other suitable source using the vendor identifier. In some embodiments, the content store 740 may also store one or more targeting criteria associated with stored objects and identify one or more characteristics of a user to which the object is eligible to be presented.

In one embodiment, edge store 760 stores the information describing connections between users and other objects on social networking system 700 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 700, such as expressing interest in a page on the social networking system, sharing a link with other users of the social networking system, and commenting on posts made by other users of the social networking system. Edge store 760 stores edge objects that include information about the edge, such as affinity scores for objects, interests, and other users. Affinity scores may be computed by social networking system 700 over time to approximate a user's affinity for an object, interest, and other users in social networking system 700 based on the actions performed by the user. Multiple interactions between a user and a specific object may be stored in one edge object in edge store 760, in one embodiment. In some embodiments, connections between users may be stored in user profile store 720, or user profile store 720 may access edge store 760 to determine connections between users.

Computer System Overview

Figure 8:
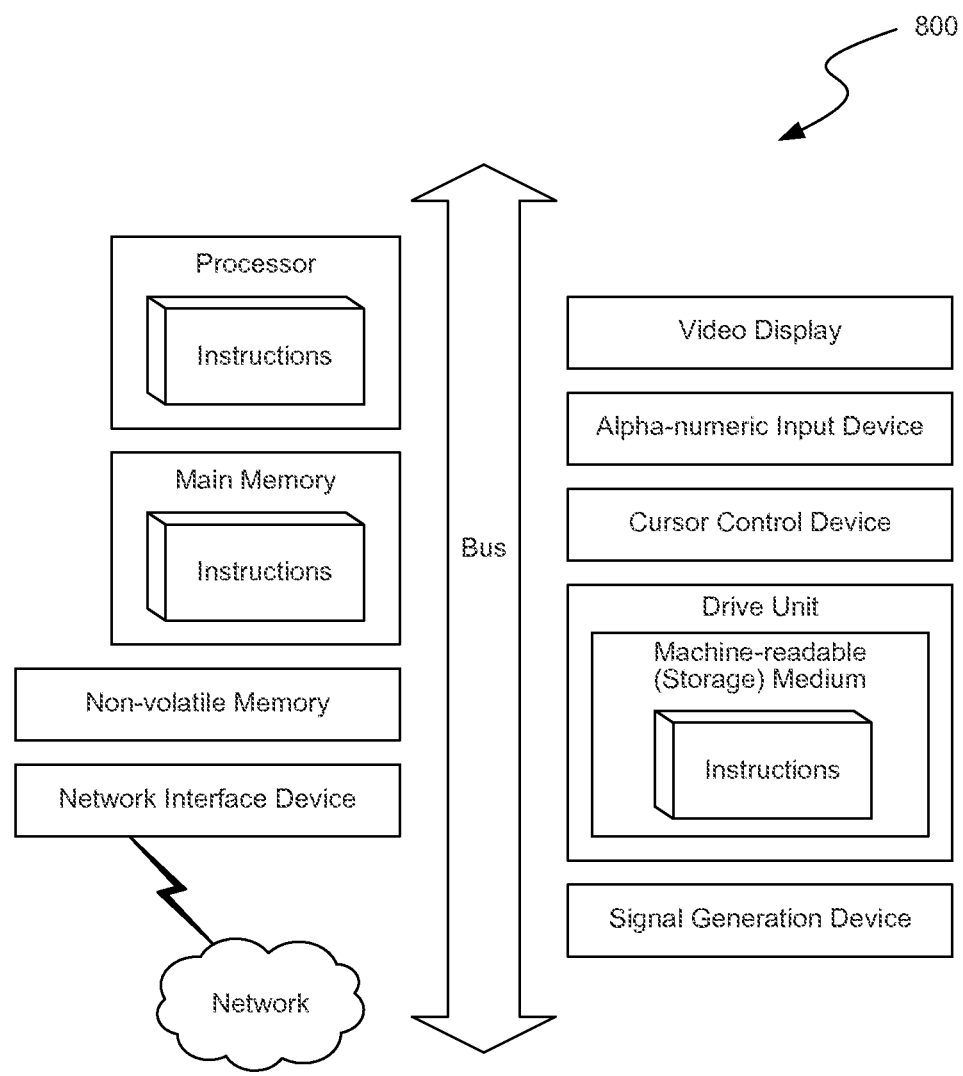
FIG. 8 shows a diagrammatic representation of a machine in the example form of a computer system.

FIG. 8 shows a diagrammatic representation of a machine in the example form of a computer system 800, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, a switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding, or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine- or computer-readable media used to actually effect the distribution.

Further examples of machine- or computer-readable media include, but are not limited to, recordable type media such as volatile and non-volatile memory devices, floppy and other removable disks, hard disk drives, optical disks (e.g., Compact Disk Read-Only Memory (CD ROMs), Digital Versatile Discs (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connections between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples; alternative implementations may employ differing values or ranges.

The teachings of the disclosure provided herein can be applied to other systems, not necessarily the system described above. The elements and acts of the various embodiments described above can be combined to provide further embodiments.

Any patents, applications, and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and the best mode contemplated, no matter how detailed the above appears in text, the teachings can be practiced in many ways. Details of the system may vary considerably in its implementation details while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the disclosure.

What is claimed is:

1. A computer-implemented method, comprising:
processing, by a threat detection tool executing at a processor in a social networking system, a plurality of accesses of private data associated with end-users of the social networking system to identify associated query structures, wherein the plurality of accesses of the private data are data accesses of the private data associated with the end-users and initiated by a source user account associated with a source user who is authorized to access the private data, wherein the source user is a user who has obtained a token, from the social networking system, that authorizes the source user to access the private data associated with the end-users, and wherein the plurality of accesses of the private data are stored in one or more private access logs in computer memory on the social networking system, wherein the plurality of accesses of the private data are initiated by the source user account occur over a specified duration of time;
applying, by the threat detection tool, one or more filters to the plurality of accesses of the private data of the source user to identify a subset of the plurality of accesses of the private data, wherein the subset of accesses of the private data have query structures that indicate specific targets;
processing, by the threat detection tool, the specific targets to determine whether an access pattern exists, wherein the access pattern indicates a measure of commonality among two or more of the specific targets; and
triggering, by the threat detection tool, an alarm based on a determination that the access pattern exists.

2. The computer-implemented method of claim 1, wherein the alarm indicates a potential advanced persistent threat.

3. The computer-implemented method of claim 1, wherein the specific targets comprise end-user accounts associated with the social networking system.

4. The computer-implemented method of claim 1, wherein the access pattern exists if the measure of commonality exceeds a threshold.

5. The computer-implemented method of claim 1, wherein processing the specific targets to determine if the data access pattern exists further comprises:
identifying, by the threat detection tool, factors associated with the specific targets;
comparing, by the threat detection tool, the factors to each other to identify factors that are common among the specific targets; and
determining, by the threat detection tool, the measure of commonality among the two or more of the specific targets based on the identified factors that are common.

6. The computer-implemented method of claim 5, further comprising:
determining, by the threat detection tool, a quantity of the factors that are common among the two or more of the specific targets; and
applying, by the threat detection tool, a weight to one or more of the factors that are common among the two or more of the specific targets.

7. The computer-implemented method of claim 6, wherein determining the measure of commonality among the one or more of the specific targets is based on the quantity and associated weights of the factors that are common.

8. The computer-implemented method of claim 1, further comprising:
marking, by the threat detection tool, one or more of the plurality of accesses of the private data associated with the two or more of the specific targets if the access pattern exists.

9. The computer-implemented method of claim 1, wherein the specified duration of time is expanded if the measure of commonality among the two or more of the specific targets exceeds a threshold.

10. The computer-implemented method of claim 1, further comprising:
identifying, by the threat detection tool, the source user account; and
sending, by the threat detection tool, a notification of the alarm to the source user account if the access pattern exists.

11. The computer-implemented method of claim 10, wherein the notification includes a threat severity.

12. The computer-implemented method of claim 10, wherein the notification includes an indication of one or more of the plurality of accesses of the private data associated with the two or more of the specific targets.

13. The computer-implemented method of claim 12, further comprising:
receiving, by the threat detection tool, a response to the notification, the response originating from the source user account and indicating whether the source user intended to initiate the one or more of the plurality of accesses of the private data.

14. A computer-implemented method comprising:
processing, by a processor in a social networking system, a plurality of accesses of private data associated with end-users of the social networking system to identify associated query structures, wherein the plurality of accesses of the private data are data accesses of the private data associated with the end-users and initiated by a source user account associated with a source user, wherein the source user is a user who has obtained a token, from the social networking system, that authorizes the source user to access the private data associated with the end-users, wherein the plurality of accesses of the private data are initiated by the source user account occur over a specified duration of time;
applying, by the processor, one or more filters to the plurality of private data accesses of the source user to identify a subset of the plurality of accesses of the private data, wherein the subset of accesses of the private data have query structures that indicate specific end-user accounts;
processing, by the processor, the specific end-user accounts using a pre-defined rule set to determine whether an access pattern exists, wherein the access pattern indicates a measure of commonality among two or more of the specific targets;
triggering, by the processor, a pre-alarm based on a determination that the access pattern exists, wherein the alarm indicates a potential threat;
sending, by the processor, a notification of the pre-alarm to the source user account if the access pattern exists; and
in response to receiving a confirmation of the legitimacy of the pre-alarm, triggering, by the processor, an alarm indicating the threat.

15. The computer-implemented method of claim 14, wherein the alarm indicates a potential advanced persistent threat.

16. The computer-implemented method of claim 14, wherein the pre-defined rule set is adaptive.

17. The computer-implemented method of claim 14, wherein the specified duration of time is expanded if the measure of commonality among the specific targets exceeds a threshold.

18. The computer-implemented method of claim 14, wherein the notification of the pre-alarm includes a threat severity and an indication of one or more of the plurality of accesses of the private data associated with the two or more of the specific targets.

19. A threat detection tool, comprising:
a processor;
a query identification module configured to process a plurality of accesses of private data associated with end-users to identify associated query structures, wherein the plurality of accesses of the private data are data accesses of the private data associated with the end-users and initiated by a source user account associated with a source user, wherein the source user is a user who has obtained a token, from a social networking system, that authorizes the source user to access the private data associated with the end-users, and wherein the plurality of accesses of the private data are stored in one or more private access logs in computer memory on the social networking system, wherein the plurality of accesses of the private data are initiated by the source user account occur over a specified duration of time;
a filter module configured to apply one or more filters to the plurality of private data accesses to identify a subset of the plurality of private data accesses of the source user, wherein the subset of accesses of the private data have query structures that indicate specific targets;
a pattern detection module configured to process the specific targets to determine whether an access pattern exists, wherein the access pattern indicates a measure of commonality among two or more of the specific targets; and
a threat trigger module configured to generate an alarm based on a determination that the access pattern exists.

20. The threat detection tool of claim 19, further comprising:
a notification module configured to query the source user account to confirm a legitimacy of the alarm.

21. A threat detection system, comprising:
one or more processors;
a storage device having computer-readable instructions stored thereon, the instructions, when executed by the one or more processors, cause the one or more processors to:
process a plurality of accesses of private data associated with end-users of a social networking system to identify associated query structures, wherein the plurality of accesses of the private data are data accesses of the private data associated with the end-users and initiated by a source user account associated with a source user, wherein the source user is a user who has obtained a token, from the social networking system, that authorizes the source user to access the private data associated with the end-users, and wherein the plurality of accesses of the private data are stored in one or more private access logs in computer memory on the social networking system, wherein the plurality of accesses of the private data are initiated by the source user account occur over a specified duration of time;
apply one or more filters to the plurality of accesses of the private data of the source user to identify a subset of the plurality of private data accesses, wherein the subset of accesses of the private data have query structures that indicate specific targets;
process the specific targets to determine whether an access pattern exists, wherein the access pattern indicates a measure of commonality among two or more of the specific targets; and
trigger an alarm based on a determination that the access pattern exists.

* * * * *